United States Patent [19]

Stachiw et al.

[11] 4,337,105
[45] Jun. 29, 1982

[54] SPHERICAL SEGMENT INNER SURFACE FORCE APPLICATOR FOR LAMINATING NON-PLANAR SURFACES

[75] Inventors: Jerry D. Stachiw, El Cajon; Donald L. Endicott, Jr., San Diego, both of Calif.

[73] Assignee: The United States of America as represented by the Secretary of the Navy, Washington, D.C.

[21] Appl. No.: 183,913

[22] Filed: Sep. 4, 1980

[51] Int. Cl.³ .................. B29C 17/06; B30B 5/02; B32B 1/00; B32B 1/06; B32B 1/10
[52] U.S. Cl. ........................... 156/87; 100/211; 156/212; 156/215; 156/221; 156/293; 156/423; 156/493
[58] Field of Search .............. 156/87, 212, 215, 221, 156/293, 423, 493; 100/211

[56] References Cited

U.S. PATENT DOCUMENTS

| 191,533 | 6/1877 | Kent | 100/211 |
|---|---|---|---|
| 2,342,988 | 2/1944 | Vidal | 156/222 |
| 2,415,504 | 2/1947 | MacDonald | 156/493 |
| 2,441,699 | 5/1948 | Gramelspacker | 156/493 |
| 3,228,330 | 1/1966 | Myers | 100/211 |
| 3,248,001 | 4/1966 | McGinnis | 100/211 |
| 3,661,683 | 5/1972 | Engel et al. | 100/211 |
| 3,844,717 | 10/1974 | Sodickson et al. | 100/211 |
| 3,870,582 | 3/1975 | Brackett et al. | 156/383 |
| 4,030,961 | 6/1977 | Straeten et al. | 100/211 |

FOREIGN PATENT DOCUMENTS

| 949746 | 9/1949 | France | 156/212 |
|---|---|---|---|
| 51-21034 | 6/1976 | Japan | 156/423 |
| 588130 | 1/1978 | U.S.S.R. | 156/423 |

*Primary Examiner*—James C. Cannon
*Attorney, Agent, or Firm*—Robert F. Beers; Ervin F. Johnston; James O. Skarsten

[57] ABSTRACT

A system is provided for applying a force to selected compliant material which is in adjacent relationship with the inner surface of a rigid spherical segment. The system includes an elastomeric spherical segment having an apex and a radius of curvature which is less than the radius of curvature of the inner surface of the rigid spherical segment when the elastomeric segment is in an undeformed condition. Operative structure is provided for initially spacing the elastomeric segment from the rigid spherical segment, so that the elastomeric segment is in point contact relationship with the compliant material, and for controllably urging the elastomeric segment toward the compliant material after the initial spacing, until the curvature of the elastomeric segment is conformed to the curvature of the inner surface of the spherical segment.

11 Claims, 8 Drawing Figures

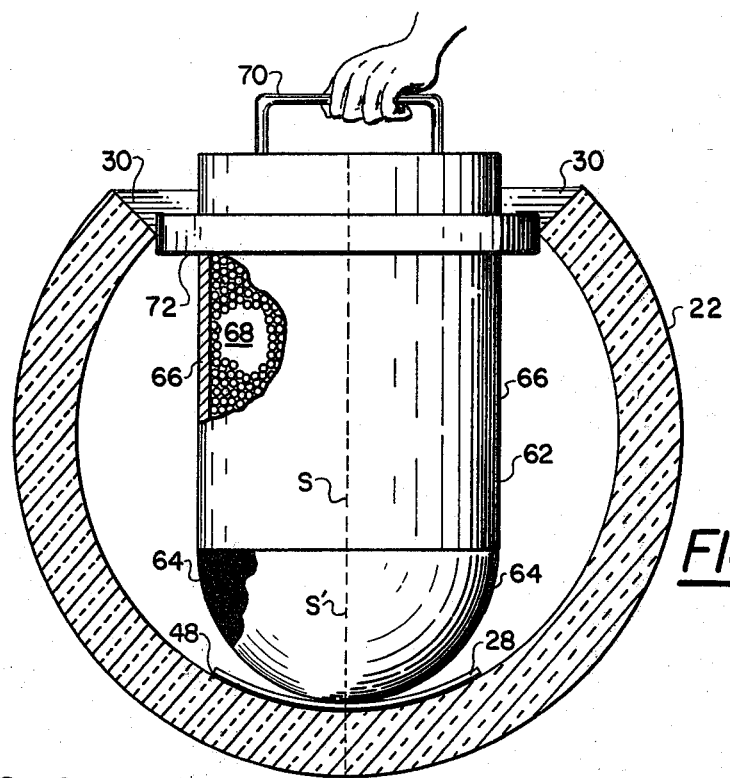
FIG.3
FIG.4
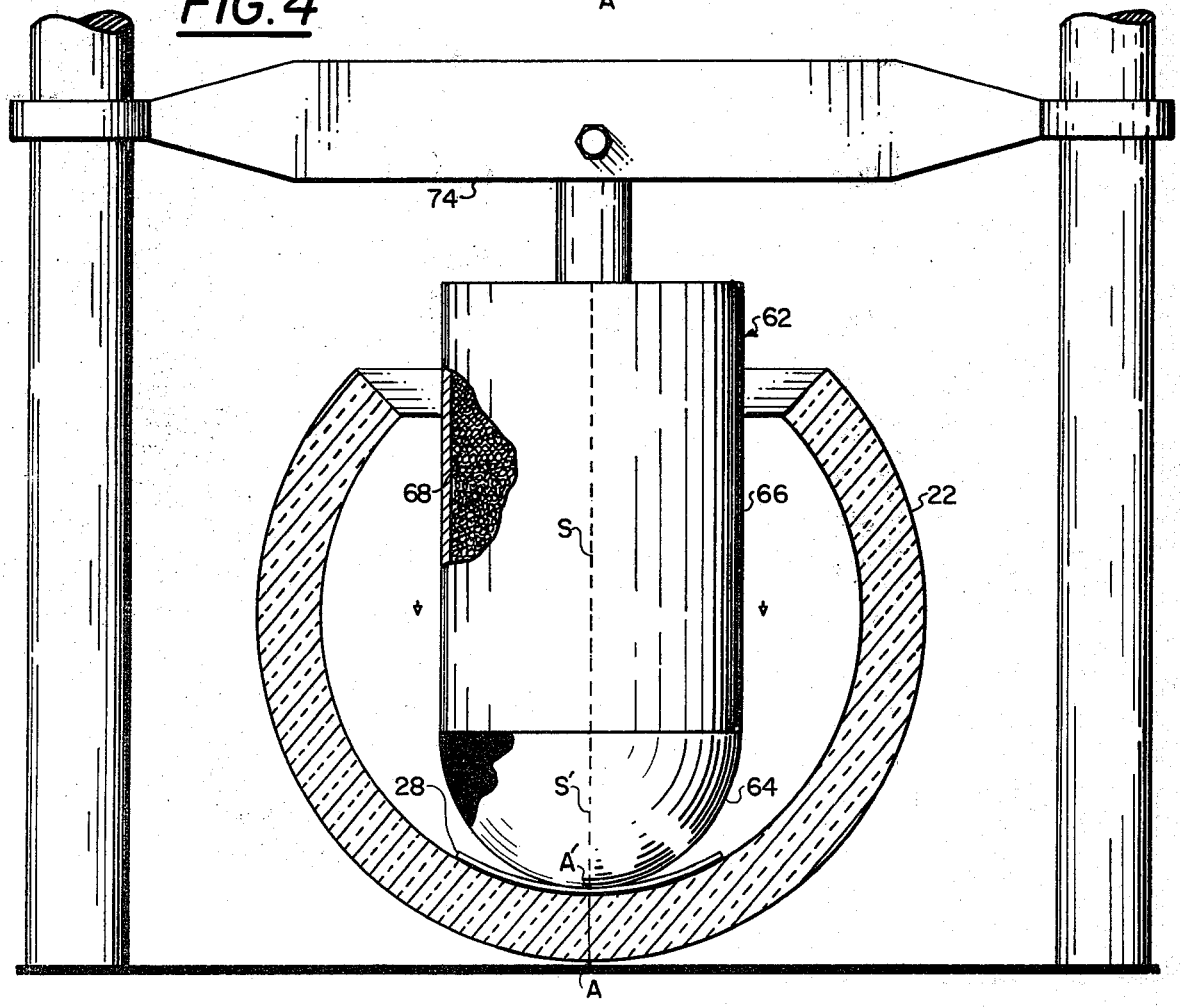

SPHERICAL SEGMENT INNER SURFACE FORCE APPLICATOR FOR LAMINATING NON-PLANAR SURFACES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to the field of systems for applying a force to compliant material which is adjacent to the inner surface of a rigid spherical segment, so that the compliant material is controllably spread across the segment to expel air bubbles from the compliant material. More particularly, the invention pertains to such systems wherein an elastomeric spherical segment containing particulate weighting material is selectively manipulated to spread the compliant material. Even more particularly, the invention pertains to systems of the above type which are employed to fasten selected structure or material to the inner surface of a hyperhemisphere by means of a bonding adhesive, it being important to insure that no cavities or pockets are present in the adhesive after it has cured.

It has been found that if a window having the shape or configuration of a spherical segment, such as a hyperhemisphere, is employed in a submarine periscope housing system to protect optical or infrared image sensing equipment, various advantages are realized. Advantages include improved viewing capability and reduced resistance to motion through water. A periscopic housing system which employs a hyperhemispherical window has been successfully designed, fabricated and tested, and is disclosed in U.S. Pat. No. 4,150,875, issued to Jerry D. Stachiw and George M. Horn for a "Pressure Resistant Housing" on Apr. 24, 1979.

It will be readily apparent that a submarine viewing system, in order to have maximum utility, must be capable of functioning in frigid marine environments, such as an Arctic environment. Consequently, it is necessary to continually conduct substantial amounts of heat to the window of the viewing system, to prevent the formation of ice upon the external surface of the window. Ice formation must be avoided, since a coating of ice of more than minute thickness prevents both optical and infrared images from entering the window and being detected by viewing equipment contained therein.

In order to sufficiently heat a hyperhemispherical window used in a periscopic viewing system, while avoiding interference with azimuthal scanning activity of viewing equipment contained therein, an electrical heating pad, or cap heater, might be bonded to the inner surface of the hyperhemispherical window, at and around the apex thereof. In the past, attempts have been made to bond a cap heater to an inner hyperhemispherical surface by means of an adhesive material spread therebetween. However, the adhesive material generally has contained air bubbles, which could not be squeezed out of the portion of the adhesive lying between the heater and the surface, and the bubbles would cause void spaces in the adhesive after it had dried. Since heat could not flow from the cap heater to the hyperhemispherical window through such voids, the cap heater was likely to become extremely hot in the vicinity of the voids, and be severly damaged or destroyed.

In their invention, Applicants provide a system for enabling structure or a sheet of material to be adhesively bonded to the inner surface of a spherical segment in such manner that all air bubbles initially present in the adhesive are expelled therefrom. As far as is known, no tool or technique is available in the prior art which is capable of performing such task. It is anticipated that by means of their invention, a cap heater may be joined to the inner surface of a hyperhemispherical window in such manner that heat is enabled to flow from the heater to the window with substantially even or uniform heat transfer, at every point of the heater-window interface.

SUMMARY OF THE INVENTION

The present invention provides apparatus for applying force to selected compliant material which is adjacent to the inner surface of a rigid spherical segment, and includes an elastomeric means for selectively coupling compressive force to the compliant material, the elastomeric means having an apex and an outer surface radius of curvature which is less than the inner surface radius of curvature of the rigid spherical segment when the elastomeric means is in an undeformed condition. The apparatus further includes operative means for initially spacing the elastomeric means from the rigid spherical segment so that the elastomeric means is in its undeformed condition and so that the apex is in point contact relationship with the compliant material. Subsequent to the initial spacing of the elastomeric means, the operative means controllably urges the elastomeric means toward the compliant material, until the elastomeric means is selectively conformed to the curvature of the inner surface of the rigid spherical segment. The movement of the elastomeric means toward the compliant material causes a steadily increasing portion of the compliant material to be included within a compressive force zone, as increasing portions of the compliant material are compressed between the rigid segment and the conforming elastomeric means. The compressive force zone commences at the point of contact between the apex and the compliant material, and continues outwardly therefrom, across the inner surface of the spherical segment and through the compliant material. As the compressive force zone moves outwardly, every point of the compliant material lying on the boundary or circumference of the zone experiences a compressive force.

Preferably, the operative means includes a shaft, the elastomeric means being joined to one end thereof. The operative means further includes means for initially suspending the shaft in a vertical orientation, so that the apex of the elastomeric means is in point contact with the compliant material, and for thereafter enabling the shaft and the elastomeric means to descend downwardly. The shaft contains particulate weighting material, the collective weight thereof being selected in relationship to the compliant material so that upon release of the shaft, gravity acting upon the weighting material urges the elastomeric means towards the rigid spherical segment and generates the aforementioned compressive force zone. The collective weight of the particulate weighting material is selected in relationship to the compliant material so that a critical minimum force is exerted at each point on the boundary of the compressive force zone as the compressive force zone expands outwardly, such critical minimum force being sufficient to prevent air bubbles or cavities from entering any portion of the compliant material which is included within the compressive force zone.

In a preferred embodiment, the spherical segment comprises a hyperhemisphere, and the compliant material comprises a heating cap of selected material and a layer of viscous adhesive, for bonding the heating cap to a portion of the inner surface of the hyperhemisphere. The elastomeric means comprises an elastomeric spherical segment, of rubber or like material, which is joined to the end of a hollow shaft so that the axes of the shaft and elastomeric segment are colinear. The hollow shaft passes through a circular guide member having outer dimensions which match the dimensions of an access port of the hyperhemisphere, so that the shaft is movable only in a vertical direction when inserted through the access port. A handle is joined to the shaft at the end opposite the spherical segment, for enabling an operator to manipulate the device of the preferred embodiment to controllably compress the cap heater and adhesive between the inner surface of the hyperhemisphere and the elastomeric segment.

OBJECTS OF THE INVENTION

An important object of the present invention is to provide a system which is capable of expelling air bubbles from a layer of adhesive material which is used to bond a selected structure or sheet of material to the inner surface of a segment of a sphere, before the adhesive dries or is cured, and for avoiding the presence of air cavities in the adhesive layer after the adhesive has cured.

Another object is to minimize the thickness of a layer of adhesive used in a system of the above type.

Another object is to provide a system for expelling air bubbles and air pockets from various types of viscous materials which are to be spread over the inner surface of a spherical segment, and to provide improved uniformity in the thickness of such applied viscous materials.

Another object is to provide a system for conducting substantial amounts of heat to a hyperhemispherical window used to house viewing equipment, in a manner which does not interfere with viewing activity.

Another object is to provide a system for bonding a heating element to the inner surface of a hyperhemisphere in a manner which enables heat to be uniformly transferred from the heating element to the hyperhemisphere, at every point of the element-hemisphere interface.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 3 is a perspective view showing an embodiment of the invention employed in bonding the heating unit, a portion of the embodiment being broken away for illustration purposes.

FIG. 4 is a perspective view showing a modification of the embodiment of FIG. 3.

DETAILED DESCRIPTION OF THE PREFERRED EMBODIMENT

Figure 1:
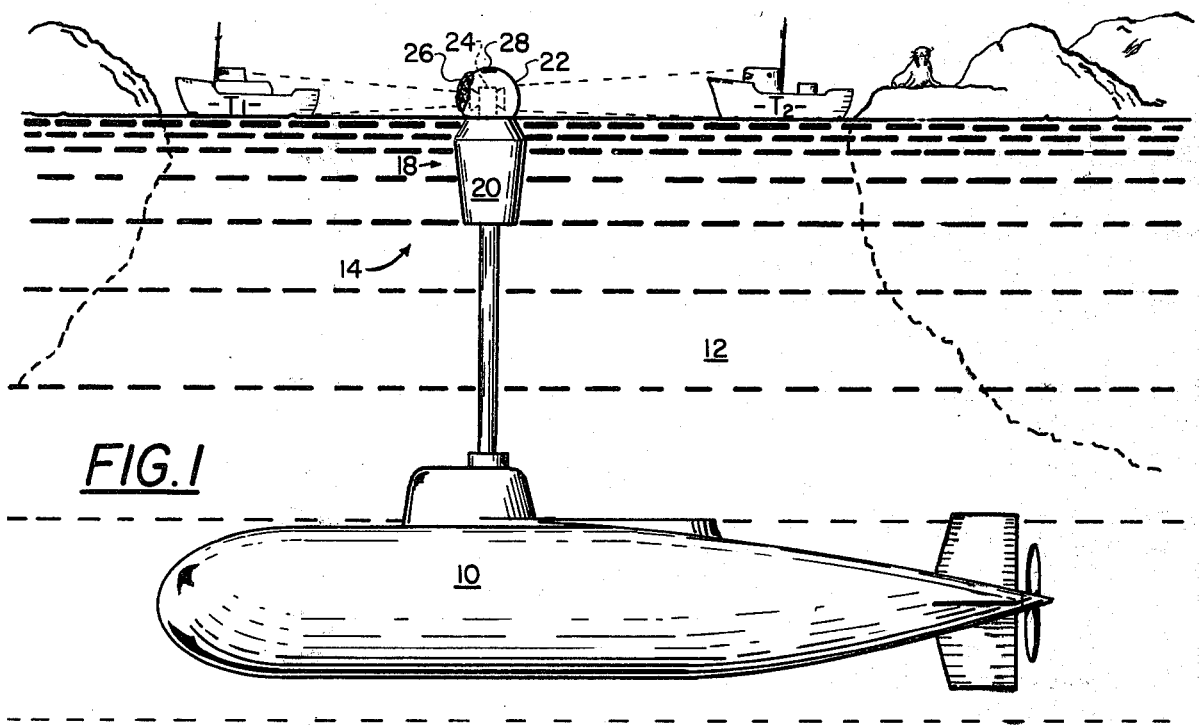
FIG. 1 is a perspective view showing a submarine operating in a frigid marine environment, an embodiment of the invention being required to fabricate an important component of the periscope system of the submarine.

Referring to FIG. 1, there is shown a submarine 10 operating in a frigid marine environment 12, such as the Arctic Ocean, in proximity to targets $T_1$ and $T_2$, both $T_1$ and $T_2$ projecting heat images, or distinct infrared signal patterns. Submarine 10 is provided with a periscope system 14 which includes a mast 16, supporting a housing 18. Housing 18 includes a mounting or base 20, formed of a metallic material, and a hyperhemispherical window 22 sealably joined thereto, window 22 being formed of germanium or other material which is transmissive to infrared radiation. Infrared image sensing equipment 24 is protectively enclosed within window 22 for sensing infrared information which passes through window 22, from any azimuthal angle in relation to submarine 10.

FIG. 1 shows housing 18 situated at the seawater-air interface of environment 12, so that a substatial layer of ice 26 will form on the external surface of window 22 if some means for heating the window is not provided. Ice formation 26 is shown on window 22 to illustrate that ice will prevent sensor 24 from viewing an infrared image of target $T_1$ through the ice. On the other hand, an infrared image of target $T_2$, which is not blocked by a deposit of ice, is viewed by sensor 24. Therefore, in order to conduct sufficient heat to window 22 to prevent ice formation thereupon, a heating unit 28, containing an electrical heating element, is bonded to the inner surface of hyperhemispherical window 22, in a manner hereinafter described. The heating unit is positioned so that its center point C is directly below point A, the apex of hyperhemispherical window 22.

Figure 2:
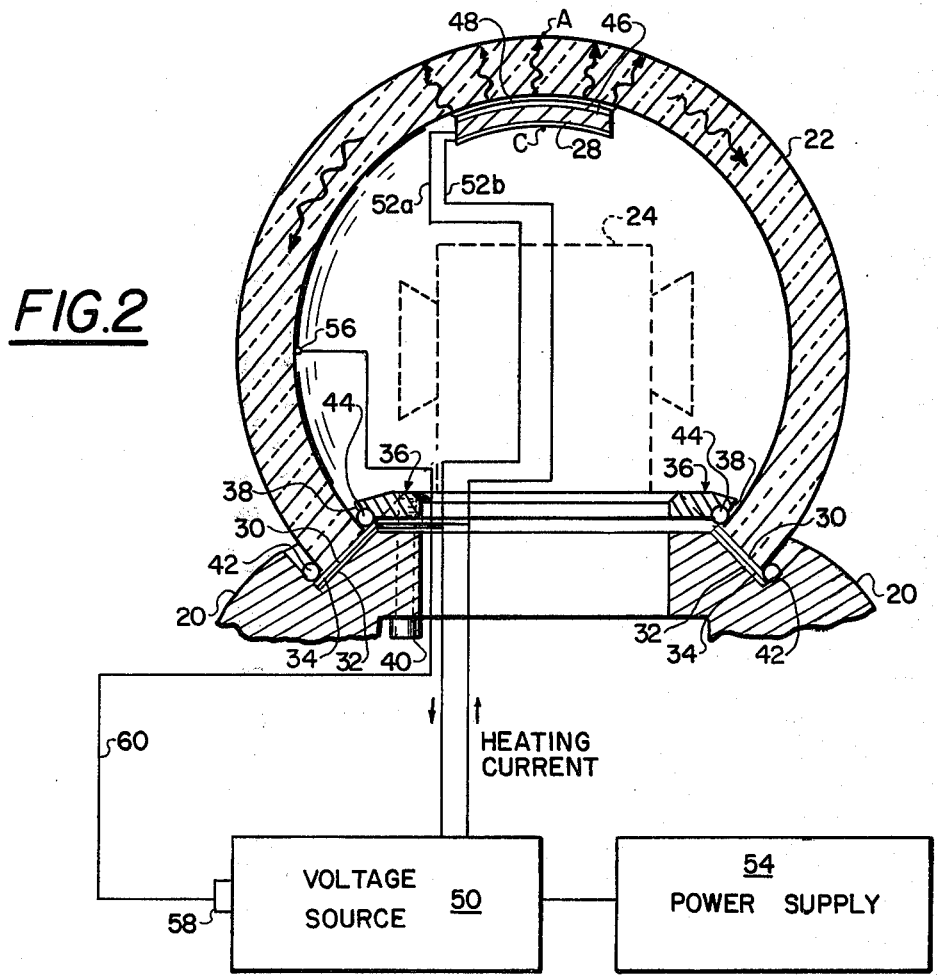
FIG. 2 is partially a sectional view and partially a block diagram showing a hyperhemispherical window for the periscope system, together with a heating unit for the window which has been bonded to the window by means of an embodiment of the invention.

Referring to FIG. 2, there is shown hyperhemispherical window 22 and mounting 20 immovably joined together, along a seating surface 30 of window 22 and a bearing surface 32 of mounting 20. Seating surface 30 and bearing surface 32 are matching frustoconical surfaces, a gasket 34 being positioned therebetween. Mounting 20, window 22 and gasket 34 are retained in immovable relationship by means of a split ring 36, which has an outside edge 38 shaped and dimensioned to match the inside curvature and inside dimensions of hyperhemispherical window 22, in proximity to the joint between the window and the mounting. Bolts 40 are employed to secure split ring 36 to mounting 20, and also to compress an external O-ring 42 between mounting 20 and window 22 and an internal O-ring 44 between window 22 and split ring 36. Split ring 36 and O-rings 42 and 44 cooperate to fixably retain mounting 20 and window 22, and also to seal the joint therebetween against very high pressure, in a manner which is described in greater detail in the above-referenced patent.

Heating unit 28 usefully comprises a flat, circular pad-like structure, formed of compliant material, and contains an electrical heating element 46, which may comprise a grid of electrical wires. Heating unit 28 is bonded to the inner surface of hyperhemispherical window 22 by spreading or placing a layer of bonding adhesive 48 between the upper portion of window 22 and a surface of the heating unit, hereinafter referred to as the adjacent surface of the unit, the opposite surface of the unit hereinafter being referred to as the exposed surface. By bonding and positioning heating unit 48 as described above, obstruction of viewing equipment 24 is avoided, regardless of the azimuthal angle to which equipment 24 may be oriented.

Referring further to FIG. 2, there is shown a 110 V voltage source 50, usefully contained in mounting 20, which is electrically coupled to electric heating element 46 through leads 52a and 52b. Power for voltage source 50 is provided by a power supply 54.

When current is coupled to element 46, heat is transferred from heating unit 28 to window 22 by the process of heat conduction. A temperature probe 56, such as a standard thermocouple, is joined to the inner surface of hyperhemispherical window 22 to monitor the temperature thereof, the output of thermocouple 56 being coupled to a thermo-static control 58 through a lead 60. Thermo-static control 58 regulates voltage source 50, and is set to enable current to flow to the heating element of heating unit 28 as long as the temperature sensed by thermocouple 56 is below a predetermined critical temperature. The critical temperature is the temperature of the inner surface of window 22 when the outer surface thereof is in the range 35° F.–40° F., which is sufficient to prevent ice formation thereupon.

Referring to FIG. 3, there is shown a device 62 which may be used to apply heating unit 28, that is, to bond it to the inner surface of hyperhemispherical window 22 so that the thickness of adhesive layer 48 is substantially uniform.

More importantly, the use of applicating device 62 insures that no air bubbles or air cavities are contained in adhesive layer 48, after the bonding process has been completed. As aforementioned, if air bubbles or cavities are present in layer 48, extreme heat may become concentrated at the locations of such cavities, since heat connot be conducted therethrough. Such heat concentrations result in the eventual distruction of heating unit 28.

Referring further to FIG. 3, there is shown device 62 including an elastomeric end piece 64, joined to one end of a hollow shaft 66. End piece 64 is formed of rubber or like conformable material and comprises a solid, or for some applications a hollow, spherical segment, the radius of curvature of end piece 64 being less than the radius of curvature of hyperhemispherical window 22 when the end piece is in an undeformed condition. Shaft 66 is filled with fine particulate weighting material, such as small particles of lead 68, and their respective axes S and S' are colinear. A handle 70 is joined to shaft 66, at the end thereof opposite end piece 64, to enable an operator to manipulate device 62 during the process of bonding heating unit 28.

To commence the bonding process, window 22 is inverted so that the access port of the window is oriented upwardly, the access port comprising an opening into the window which is circumscribed by seating surface 30. A guide 72 is placed around shaft 66, the outer dimensions of guide 72 matching the dimensions of the access port. Shaft 66 and guide 72 are configured in relationship to one another so that when window 22 is inverted, and guide 72 is placed within the access port, axes S and S' are vertically oriented, and a line colinear therewith passes through apex A of hyperhemispherical window 22.

Referring to FIG. 4, there is shown alternate means for manipulating applicator device 62, such alternate means comprising precision alignment-press structure 74. Structure 74 is provided with adjustment controls for enabling end piece 64 to be initially aligned, when it is in an undeformed condition, so that apex A' of end piece 64 and center point C of heating unit 28 are cocentric to within a specific degree of accuracy. Structure 74 also enables axes S and S' to be initially aligned in a vertical orientation, to within a specified degree of accuracy. After the above initial precision alignments, structure 74 is employed to exert specified downward force upon shaft 66.

Figure 5A:
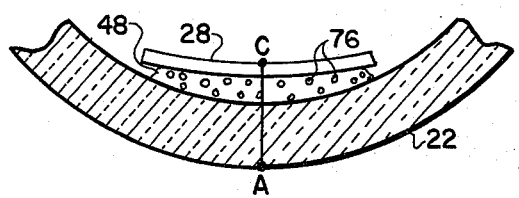
FIGS. 5A–5D are cross-sectional views showing successive stages in the use of the embodiment of FIG. 3.

Referring to FIG. 5A, there is shown an arbitrary amount of bonding adhesive 48 spread between heating unit 28 and window 22, heating unit 28 being positioned so that its center point C is directly above apex A of hyperhemisphere 22. FIG. 5A shows adhesive 48 in an uncured viscous form and containing numerous, randomly positioned, air bubbles or pockets 76.

Figure 5B:
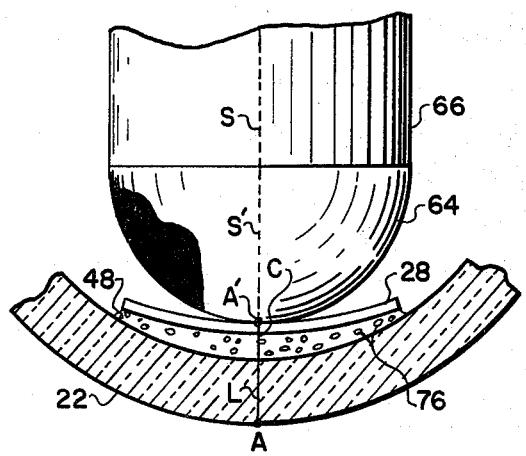

Referring to FIG. 5B, there is shown applicator device 62 manipulated so that device 62 is suspended directly above heating unit 28, point contact being made between center point C on the exposed surface of heating unit 28 and the apex A' of end piece 64. The axes of shaft 66 and end piece 64, S and S' respectively, are vertically oriented, and line L, connecting center point C and window apex A, is colinear with axes S and S'. Consequently, at a time when end piece 64 and shaft 66 commence moving downwardly, a force is exerted downwardly along line L, through heating unit 28 and bonding adhesive layer 48.

Figure 5C:
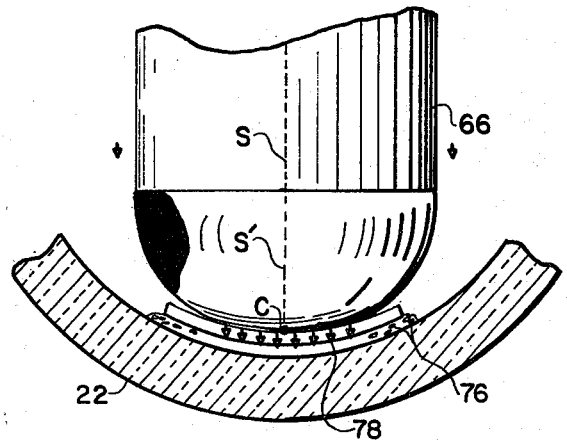

Referring to FIG. 5C, there is shown the relationship between end piece 64, heating unit 28 and adhesive layer 48 at some point in time after shaft 66 and end piece 64 have commenced a downward movement. Such movement may be solely the result of gravitational forces acting upon particulate weighting material 68, or may include both gravitational forces and downward pressure exerted on shaft 66, such as by precision adjustment of press structure 74.

Because of the rigid nature of the spherical wall of hyperhemispherical window 22, downward motion of device 62 is resisted. Because of the elastomeric nature of end piece 64, such resistance causes end piece 64 to become increasingly deformed, from its apex A' outwardly, and to be conformed to the curvature of the inner surface of hyperhemispherical window 22. As end piece 64 deforms, various points on the outer surface thereof are brought into contact with corresponding points of the exposed surface of heating unit 28.

When a given point on the external surface of end piece 64 comes into contact with the exposed surface of heating unit 28, a compressive force is exerted downwardly by such point, through heating unit 28 and adhesive layer 48 to window 22. The totality of such compressive forces comprise a compressive force zone 78, which commences at line L, as aforementioned, and moves outwardly therefrom through heating unit 28 and adhesive layer 48. By configuring end piece 64 in the form of a spherical segment, and by providing a vertical orientation to the axis thereof, all points on the external surface of end piece 64 which are at a particular elevation above point C descend at the same rate, as the end piece is urged toward window 22, and come into contact with heating unit 28 at the same time.

Therefore, as compressive force zone 78 moves outwardly, it always arrives at a particular point of bonding layer 48 before arriving at another point in the bonding layer which is at a greater distance from point C than the particular point. In another manner of speaking, the boundary of compressive force zone 78 is closed and circular as it moves outwardly through bonding adhesive 48. Also, weighting material 68 is judiciously selected in relation to the viscosity of adhesive 48, when it is in an uncured state, to insure that the downward force of the weighting material, together with downward force exerted on shaft 66, provides sufficient compressive force at every point on the boundary of force zone 78, as the zone move through bonding layer 48, to break all air bubbles and air pockets encountered by the boundary. Consequently, no air bubbles or pockets 76 remain in the portion of adhesive layer 48 which lies within compressive force zone 78.

In addition, the movement of force zone 78 through the joint between heating unit 28 and window 22 causes adhesive 48 to be spread out in a fairly even manner therebetween. The thickness of the joint is therefore of generally uniform thickness, after the adhesive has been cured, particularly if the portion of window 22 which is adjacent to heating unit 28 comprises only a very small portion of the window surface.

Figure 5D:
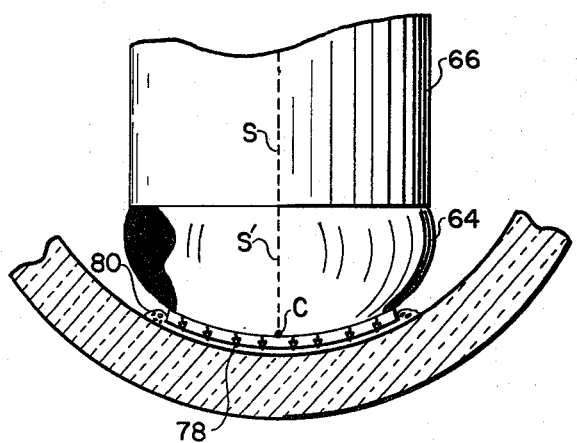

Referring to FIG. 5D, there is shown the entire exposed surface of heating unit 28 in contact with end piece 64 and compressed thereby, end piece 64 and heating unit 28 being conformed to the curvature of the inner surface of window 22. Compressive force zone 78, passing through the joint between unit 28 and 22, expels all air pockets 76 therefrom, together with excess amounts of adhesive 80. It has been found that by employing device 62 in the above manner, the amount of adhesive required to bond heating unit 28 to window 22 may be minimized. Device 62 applies compressive force to unit 28 and adhesive 48 until adhesive 48 has dried, or becomes completely cured.

Obviously, many other modifications and variations of the present invention are possible in the light of the above teachings, and, it is therefore understood that within the scope of the disclosed inventive concept, the invention may be practiced otherwise than as specifically described.

What is claimed is:

1. A method for bonding selected compliant material to a portion of the inner surface of a rigid spherical segment, said method comprising the steps of:
   spreading a quantity of initially uncured adhesive material over said portion of said inner surface;
   placing said compliant material in contact with said adhesive material;
   initially positioning an elastomeric spherical segment so that the apex of said segment contacts a point on said compliant material, said elastomeric segment being initially in an undeformed condition, the radius of curvature of said elastomeric segment being less than the radius of curvature of said inner surface of said rigid spherical segment when said elastomeric segment is in an undeformed condition; and
   urging said elastomeric segment toward said compliant material so that all points on the external surface of said elastomeric segment which are initially at the same distance from said specified point are brought into contact with said compliant material at the same time.

2. The method of claim 1 wherein:
   said urging step includes the step of coupling a compressive force downwardly from each point of said elastomeric segment which is in contact with said compliant material, said coupled force being sufficient to break down any air pocket in said adhesive material to which said coupled force is applied.

3. The method of claim 2 wherein said method includes:
   joining said elastomeric means to an end of a shaft so that the axis of said elastomeric segment and the axis of said shaft are in colinear relationship, said shaft containing selected particulate weighting material; and
   said urging step comprises the step of moving said shaft toward said compliant material to couple a controlled force through said elastomeric segment to said compliant material.

4. An apparatus for applying force to selected compliant material which is in adjacent relationship with the inner surface of a rigid spherical segment comprising:
   an elastomeric means for selectively coupling compressive force to said compliant material, said elastomeric means having an apex and a radius of curvature which is less than the radius of curvature of said inner surface when said elastomeric means is in an undeformed condition and
   operative means for initially spacing said elastomeric means from said rigid spherical segment so that said apex is in point contact relationship with said compliant material, and for controllaby urging said elastomeric means toward said compliant material, after said initial spacing, until the curvature of said elastomeric means is conformed to the curvature of said inner surface and said compliant material is selectively compressed between said rigid inner surface and said conformed elastomeric means, said operative means comprises means for manipulating said elastomeric means to initially apply a compressive force to said compliant material at said point of contact between said apex and said compliant material, and to thereafter apply compressive force to each point of said compliant material which lies within a compressive force zone which expands outwardly through said compliant material from said contact point, said compressive force zone reaching a given point of said compliant material before reaching any other point of said compliant material which is at a farther distance from said contact point than said given point, said compliant material includes a layer of selected viscous material selectively spread across said inner surface of said rigid spherical segment, and wherein said operative means comprises:
   a shaft means, said elastomeric means being joined to an end of said shaft;
   means for initially orienting said shaft means so that said elastomeric means is suspended above said viscous material in said initial spacing relationship, and for releasing said shaft means after said initial orientation; and
   particulate weighting material contained within said elastomeric means for responding to gravitational force to initially apply said compressive force to said contact point, and to apply compressive force to each point of said viscous material which lies within said compressive force zone after said shaft has been released.

5. The apparatus of claim 4 wherein: said weighting material is selected in relationship to the viscosity and thickness of said layer of viscous material to insure that as said compressive force zone expands outwardly through said layer, a minimum force is maintained at each point of said layer which lies on the boundary of said compressive force zone, said minimum force being sufficient to prevent air filled cavities present in said layer from entering said zone.

6. The apparatus of claim 4 wherein said operative means includes:
means for enabling said apex of said elastomeric means to be brought into point contact relationship with a particular point of said compliant means to within a specified degree of accuracy; and
means for exerting a specified force on said shaft means as said elastomeric means is urged toward said compliant material.

7. An apparatus for applying force to selected compliant material which is in adjacent relationship with the inner surface of a rigid spherical segment comprising:
an elastomeric means for selectively coupling compressive force to said compliant material, said elastomeric means having an apex and a radius of curvature which is less than the radius of curvature of said inner surface when said elastomeric means is in an undeformed condition and
operative means for initially spacing said elastomeric means from said rigid spherical segment so that said apex is in point contact relationship with said compliant material, and for controllably urging said elastomeric means toward said compliant material, after said initial spacing, until the curvature of said elastomeric means is conformed to the curvature of said inner surface and said compliant material is selectively compressed between said rigid inner surface and said conformed elastomeric means, said operative means comprises means for manipulating said elastomeric means to initially apply a compressive force to said compliant material at said point of contact between said apex and said compliant material, and to thereafter apply compressive force to each point of said compliant material which lies within a compressive force zone which expands outwardly through said compliant material from said contact point, said compressive force zone reaching a given point of said compliant material before reaching any other point of said compliant material which is at a farther distance from said contact point than said given point, said rigid spherical segment comprises a portion of a hyperhemispherical window formed of selective radiation transmissive material, said window having an access port, and wherein said operative means comprises:
a hollow shaft having an axis which is colinear with an axis of said elastomeric means, said elastomeric means being joined to an end of said shaft;
particulate weighting material contained within said shaft; and
means for enabling an operator to selectively insert said shaft and said elastomeric means into said hyperhemispherical window through said acesss port to position said elastomeric means in said initial spacing relationship with said compliant material, and to controllably urge said elastomeric means toward said compliant material to establish said compressive force zone.

8. The apparatus of claim 7 wherein said compliant material comprises selected structure having a surface adjacent to said inner surface of said window, said structure being conformable to the curvature of said inner surface, and a layer of initially uncured adhesive material positioned between said structure and said inner surface, and wherein:
said elastomeric means comprises an elastomeric spherical segment; and
a guiding means having outer dimensions equal to the dimensions of said access port is fitted around said shaft for limiting the direction of motion of said shaft to a direction which is parallel to the axis of said shaft when said shaft is inserted into said hyperhemispherical window.

9. The apparatus of claim 8 wherein said access port comprises a circular opening into said hyperhemispherical window such that the apex of said hyperhemispherical window, the geometrical center of said hyperhemispherical window and the center of said access port lie on the same straight line, and wherein:
said guide means comprises means having circular outer dimensions equal to the dimensions of said access port for retaining said axis of said shaft and of said elastomeric segment in colinear relationship with said straight line when said shaft and said elastomeric segment are inserted into said window.

10. An apparatus for selectively compressing compliant material which is in adjacent relationship with the inner surface of a rigid spherical segment comprising:
an elastomeric spherical segment having a radius of curvature which is less than the radius of curvature of said inner surface when said elastomeric spherical segment is in an undeformed condition and
manipulative means for initially suspending said elastomeric segment above said compliant material so that the apex of said elastomeric segment is in contact with a specified point on said compliant material, and for controllably urging said elastomeric segment toward said compliant material after said initial spacing so that all points on the external surface of said elastomeric segment which are initially at a particular elevation above said specified point come into contact with said compliant material at the same time, said compliant material comprises selected conformable material having a first surface adjacent to said inner surface of said rigid spherical segment, and a second surface opposite to said adjacent surface which faces into the interior of said rigid spherical segment, the center point of said first and second surfaces being located directly above the lower-most point of said rigid spherical segment, and wherein said manipulative means comprises;
means for initially spacing said elastomeric segment from said compliant material so that said apex is in contact with the center point of said second surface; and
particulate weighting material contained within said elastomeric segment for compressing an increasing portion of said conformable material between said elastomeric segment and said inner surface to conform said conformable material to the curvature of the inner surface of said rigid spherical segment.

11. The apparatus of claim 10 wherein said compliant material comprises a heating unit which contains an electric heating element and which is formed of conformable material, and which further includes a layer of adhesive material spread within the joint between said inner surface of said rigid spherical segment and said heating unit, air bubbles being initially contained within said adhesive material, and wherein:

said manipulative means includes a shaft, said elastomeric segment being joined to one end of said shaft so that the axes of said shaft and said elastomeric segment are colinear;

said manipulative means includes means joined to said shaft for applying a force to said shaft to urge said elastomeric segment toward said compliant material; and said particulate weighting material comprises means for cooperating with said force applied to said shaft to urge said elastomeric segment toward said compliant material so that said bubbles are moved toward the edges of said joint between said heating unit and said rigid segment.

* * * * *